United States Patent [19]

Huster et al.

[11] Patent Number: 4,737,370
[45] Date of Patent: Apr. 12, 1988

[54] METHOD OF PREPARING AND RECONSTITUTING A DRIED STARCH RICH FOOD PRODUCT AND PRODUCT THEREOF

[75] Inventors: Lienhard B. Huster, Muehldorf, Fed. Rep. of Germany; Lars Askman, Billesholm, Sweden

[73] Assignee: Nestec S.A., Vevey, Switzerland

[21] Appl. No.: 665,957

[22] Filed: Oct. 29, 1984

[30] Foreign Application Priority Data

Nov. 4, 1983 [CH] Switzerland .................. 5956/83

[51] Int. Cl.⁴ .............................. A23L 1/214
[52] U.S. Cl. ................... 426/113; 426/640; 426/457; 426/473; 426/506; 426/509; 426/394; 426/412; 426/77; 426/637
[58] Field of Search ............. 426/457, 113, 473, 637, 426/640, 506, 509, 394, 412, 77

[56] References Cited

U.S. PATENT DOCUMENTS

| | | | |
|---|---|---|---|
| 727,585 | 5/1903 | Bunyan | 426/457 |
| 1,908,489 | 5/1933 | Sartakoff | 426/457 |
| 3,012,897 | 12/1961 | Sullivan et al. | 426/457 |
| 3,016,303 | 1/1962 | Cooley | 426/457 |
| 3,021,223 | 2/1962 | Eskew | 426/637 |
| 3,067,042 | 12/1962 | Pader | 426/457 |
| 3,260,607 | 7/1966 | Asselbergs et al. | 426/457 |
| 3,275,458 | 9/1966 | Willard | 426/457 |
| 3,395,025 | 7/1968 | Hermanson | 426/113 |
| 3,418,142 | 12/1968 | Willard | 426/457 |
| 3,490,915 | 1/1970 | Tressler | 426/473 |
| 3,526,512 | 9/1970 | Collins et al. | 426/473 |
| 3,620,761 | 11/1971 | Spring | 426/473 |
| 3,689,291 | 9/1972 | Draper | 426/123 |
| 4,103,034 | 7/1978 | Ronai et al. | 426/457 |
| 4,400,402 | 8/1983 | Vibbert et al. | 426/457 |
| 4,417,405 | 11/1983 | Fuller | 426/457 |
| 4,514,426 | 4/1985 | Jordan et al. | 426/412 |

FOREIGN PATENT DOCUMENTS

| | | | |
|---|---|---|---|
| 1395654 | 3/1965 | France. | |
| 661820 | 11/1951 | United Kingdom | 426/113 |
| 966050 | 8/1964 | United Kingdom | 426/113 |
| 2127270 | 4/1984 | United Kingdom | 426/473 |

OTHER PUBLICATIONS

J. of Agriculture of U. of Puerto Rico 60(2), pp. 215–223 (1970), Steele et al.
Food Technology, vol. 9, No. 8, pp. 393–395 (1955), Mullins et al.
Food Engineering 7/61, Spadaro et al.
USDA ARS 73-30, 9/60.
Food Technology 5/54, p. 263 plus.
Food Technology, vol. 18, No. 8, 1964, pp. 91–94.
Food Processing 6/61.
Food Technology, vol. XVI, No. 4, 1962, pp. 99–101.

*Primary Examiner*—Steven Weinstein
*Attorney, Agent, or Firm*—Vogt & O'Donnell

[57] ABSTRACT

A dried puree of a starchy material, preferably the yam, in the form of flakes is compacted under a pressure of from 50 to 120 bars and then reduced to granules having a bulk density of from 0.40 to 0.65 kg/l. The granules may be placed in a water-permeable bag which may be filled to 45 to 80% of its volume with the starchy material. In the case of the yam, the dry matter content of the reconstituted material is on the order of 30 to 36%.

13 Claims, No Drawings

METHOD OF PREPARING AND RECONSTITUTING A DRIED STARCH RICH FOOD PRODUCT AND PRODUCT THEREOF

This invention relates to a dry starchy cake in a water-permeable bag and to a process for its production.

Among the edible tubers rich in starch, the yam, in particular, plays an important part in the feeding of native populations of Africa, for example. In the popular dish known locally as "foutou" or "iyan", the yam is eaten fresh after having been cooked and pounded for a considerable length of time.

However, the yam is a seasonal plant of which the tissues and the starch degrade quickly on storage. It is for this reason that another popular dish known locally as "amala", which is a yam flour reconstituted in boiling water, enables these tubers to be eaten for a longer part of the year. Now, the traditional small-scale process for producing this flour does not effectively utilize the tuber and involves high losses of starting material. In addition, the texture of the reconstituted product is too gummy.

It is for this reason that various researchers have attempted, and described their efforts, to adapt recent processes for the production of potato flakes to the production of yam flakes with a view to enabling dishes similar to foutou to be prepared rapidly or instantaneously by reconstitution with hot water and, optionally, pounding using a pestle. This attempted adaptation has come up against problems of sticking encountered either during production, particularly at the drying stage, or during reconstitution. These problems have not been attributed solely to the free starch which is released during production of the flakes, but to the fact that, compared with the potato, the yam differs significantly in the composition of the starch, the nature of the granules and behaviour on cooking.

The object of the present invention is to provide a dry starchy product based on the yam, for example, which does not present any problems in regard to reconstitution, and to provide also a simple and effective process for producing that product.

More particularly, the object of the present invention is to provide a dry starchy cake in a water-permeable bag.

The starchy cake according to the present invention is characterized in that the bag is filled to 45–80% of its volume with granules of dry, compacted starchy flakes, the granules having a bulk density of from 0.40 to 0.65 kg/l.

In the context of the present invention, the term "starchy" applies generally to any edible vegetable rich in starch or to any part thereof, such as grains of cereals or leguminous plants, tubers, particularly potatoes, the various types of yam, sweet potatoes or cassava or fruit, particularly plantain for example, including plantain mixed with cassava.

When the starchy material is yam, the bulk density of the granules and the percentage of the bag volume filled are preferably such that the dry matter content of the reconstituted cake is of the order of 30 to 36% allowing for the fact that the density of the reconstituted cake is barely higher than and substantially equal to that of water.

To reconstitute the cake, the bag may be immersed in cold water which is then brought to the boil and left to simmer for about 15 minutes, after which the cake is removed from the bag. The reconstituted cake has the same shape as the bag in its expanded state and a homogeneous, coherent texture. It may be cut and eaten with a spoon or with the fingers, for example.

The crucial factor is the bulk density of the granules obtained by compacting the flakes. This is because the flakes have a large surface and a high degree of porosity which are both favorable to rapid rehydration, however, if the flakes were introduced as such into a bag, the cake obtained on reconstitution would not have a homogeneous texture. The flakes situated near the wall of the bag would expand immediately and gelatinize into a mass that would prevent the water from reaching the flakes situated at the center of the bag. The center of the cake would never be properly moistened and cooked, but instead would remain dry. For comparison, it is the same effect which brings about the formation of clumps when, for the purposes of dispersion, a flour or a starch is poured directly into boiling water. It was subsequently found that this effect could be remedied by mechanically compacting the flakes and reducing them into granules which absorb water less rapidly. The water thus has time to penetrate to the center of the bag and completely to wet the granules before they expand and gelatinize.

The granules are preferably between about 0.5 and 2 mm in size. In addition to giving very good results, this embodiment lends itself particularly well to the use of bags made of cellulose fibers of the teabag type.

The cake according to the invention may be made with any edible starchy material, particularly any cereals, leguminous plants or tubers which may themselves be made into flakes. Outside the yam season, one particularly recommended embodiment is a cake of plantain mixed with cassava.

The present invention also relates to a process for producing a dry starchy cake in a water permeable bag which is characterized in that flakes, having a moisture content of from 6 to 15%, are prepared by cleaning the starchy material, peeling, cutting, cooking, reducing to puree, drying on a drum and, optionally, remoistening, and then mechanically compacting the flakes under a pressure of from 50 to 120 bars, reducing the compacted flakes into granules having a bulk density of from 0.40 to 0.65 kg/l. The granules are placed in a water-permeable bag such that, when closed, the granules occupy from 45 to 80% of the volume of the closed bag.

To carry out the process according to the invention, therefore, flakes of the selected starchy material are initially prepared by the technique of drying a puree of that starchy material on a drum. This technique may be adapted to the particular features of the starchy material in question by the expert. It is important to ensure that the moisture content of the flakes is in the range indicated. If necessary, the moisture content of the flakes may be readjusted into that range by slight remoistening after drying. This is because flakes having a moisture content below 6% are difficult to compact into a sufficiently cohesive mass. On the other hand, flakes having a moisture content above 15% give, after compaction, a mass which is too elastic and which is difficult to reduce to granules.

Compacting may be carried out with any suitable press working on the principle of compression of a material between two rigid surfaces. The flakes may be compacted, in particular, in a cylinder press so as to form a sheet of compacted flakes ranging from 1.0 to 2.5 mm in thickness.

The compacted flakes may then be reduced to granules using a suitable apparatus capable either of breaking up and crushing a sheet or plate of compacted flakes or of detaching small fragments therefrom, for example.

Preferably, a sheet or plate of compacted flakes is broken up into fragments and the fragments thus obtained are crushed until the desired fineness of the granules is obtained.

The bag may be made of any suitable material which is chemically inert, i.e., which does not react either with the granules or with the water at boiling temperature, which shows sufficient mechanical strength and which leaves virtually a free passage for circulation of the water whilst at the same time retaining the granules. For example, it is possible to use a bag of perforated polyethylene film or of a film of interlaced cellulose fibers of the teabag type. The size given to the bag will depend upon the water content and the weight which the reconstituted cake is intended to have, allowing in particular for the taste and for the appetite of the consumer(s) for whom it is intended. A water content corresponding to a homogeneous and coherent texture may be reached precisely if the bag is filled to 45-80% of its volume with granules having a bulk density of from 0.40 to 0.65 kg/l. With granules having a bulk density of less than 0.40 kg/l, there is a risk of losing all the benefit of the process according to the invention and of obtaining on reconstitution over rapid hydration of the surface of the cake, preventing the water from reaching its center. By contrast, with granules having a bulk density of greater than 0.65 kg/l, there is a risk of unnecessarily lengthening the time required for reconstituting the cake.

When yams are used as the starchy material, the bulk density of the granules and the percentage of the bag volume filled with granules are preferably selected within the ranges indicated in such a way that the dry matter content of the reconstituted cake is of the order of 30 to 36%, allowing for the fact that the density of the reconstituted cake is barely higher than and substantially equal to that of water.

The invention is illustrated by the following Examples in which the percentages quoted are percentages by weight.

EXAMPLE 1

Yam flakes (species *Dioscorea rotundata*) are prepared from fresh Ivory Coast tubers of the Kponan variety which have a dry matter content of approximately 35%.

To this end, the tubers are cleaned and peeled by treatment either with steam or with lye, followed by vigorous scrubbing. They are pared by hand. They are then cut into 10 mm thick slices and immersed in water to prevent discoloration. The slices are cooked in steam at 98° C. for 30 minutes and then reduced to puree by pressing them with a screw through a plate or die having orifices 8.5 mm in diameter, the open area making up 40% of the surface area of the plate.

The puree is dried on a drum 1 meter in diameter and 2 meters wide rotating at 3 revolutions per minute. The drum is heated from inside with steam under a pressure of 5.75 bars. It is equipped with 5 satellites distributed at intervals of 28° and has an effective drying surface of 5.75 m$^2$ between the distribution trough for the puree and the blade which detaches the film of dried puree. This film weighs 1 g/dm$^2$ and has a water content of 7.9%. It is broken up and crushed into flakes of which 75% are between 0.4 and 1.25 mm in size. Water is sprayed onto the flakes to adjust their moisture content to 12%.

The flakes are compacted by introduction into a press comprising parallel and adjacent cylinders 15 cm in diameter which rotate synchronously in opposite directions. The rollers apply a pressure of 80 bars to the flakes which pass between them and which leave the press in the form of a 1.5 mm thick sheet. This sheet is broken up into fragments and reduced to granules which have a bulk density of 0.50 kg/l and which resemble flattened chips of which 80% are between 0.5 and 2 mm in size.

Heat-sealable bags of cellulose fibers of the teabag type are filled to 64% of their volume with these granules. The sealed bags have a volume of 314 ml of which 200 ml is occupied by 100 g of granules of compacted and crushed yam flakes. They represent a typical example of embodiment of the dry starchy cake in a water permeable bag according to the present invention.

To reconstitute the cake, the bag is immersed in cold water. The water is brought to the boil and left to simmer for 15 minutes. After only a few minutes, the cake has expanded, filled the available space and is sufficiently cooked to show a coherent texture and an elastic consistency. However, cooking is continued for a longer time to obtain an absolutely smooth texture without any clumps, which is exactly to the liking of regular eaters of foutou. The cake is then withdrawn from the water. The bag is torn open and removed. The cake has a perfectly smooth, clump-free appearance both to look at and to cut. Its consistency is elastic, i.e. flexible and soft. Its color is an attractive white slightly tinged with beige. Its odor and taste are those of a good yam. In particular, there is no noticeable difference in relation to the organoleptic qualities of a good, fresh foutou.

These dry yam cakes also have remarkable keeping qualities. Their qualities after reconstitution are intact after storage for 3 months at 30° C. In particular, no rancid odor or taste has developed during storage.

EXAMPLE 2

Dry yam cakes are prepared in the same way as described in Example 1, but with another two good varieties of the species *Dioscorea rotundata*, namely with fresh tubers of the Manpan and Krenglé varieties which also come from the Ivory Coast. For each of these two varieties, the cakes obtained have qualities after reconstitution entirely comparable with those of the cakes of Example 1.

EXAMPLES 3 TO 7

The procedure is as described in Example 1, except that the moisture content of the flakes is adjusted to different levels by slightly varying the conditions under which the puree is dried and different pressures are applied to the cylinders of the press. Particular conditions corresponding to the various tests are shown in the following Table:

| Example No. | Moisture content of the flakes % | Compacting pressure bars | Thickness of the compacted film mm | Bulk density of the granules kg/l | % of the bag volume filled with granules |
| --- | --- | --- | --- | --- | --- |
| 1 | 12 | 80 | 1.5 | 0.50 | 64 |
| 3 | 15 | 50 | 2.5 | 0.60 | 53 |
| 4 | 15 | 80 | 2.0 | 0.60 | 53 |
| 5 | 7 | 100 | 1.5 | 0.50 | 64 |

-continued

| Example No. | Moisture content of the flakes % | Compacting pressure bars | Thickness of the compacted film mm | Bulk density of the granules kg/l | % of the bag volume filled with granules |
| --- | --- | --- | --- | --- | --- |
| 6 | 7.5 | 100 | 1.4 | 0.51 | 62 |
| 7 | 8 | 100 | 1.3 | 0.52 | 61 |

The cakes of Examples 5 to 7 have qualities after reconstitution comparable with those of the cakes of Example 1. It can be seen that, by reducing the moisture content of the flakes to below 8%, they become increasingly more difficult to compact. A moisture content of 6% represents the practical lower limit. Below that limit, unnecessarily high pressures are required for obtaining only mediocre results, i.e. granules which undergo excessive disintegration.

The cakes of Examples 3 and 4 show good qualities after reconstitution. However, their keeping properties are significantly inferior to those of the cakes of the other Examples, although still satisfactory. Accordingly, the moisture content is at the upper recommended limit. It is better in any case not to exceed that limit for reasons of exaggerated plasticity of the rolled sheet which then becomes difficult to reduce to granules.

EXAMPLE 8

The procedure is as in Example 1, except that the bag is filled with 110 g instead of 100 g of granules. After reconstitution, the cake again shows a perfectly homogeneous and smooth, although slightly more dense, texture. It also weighs approximately 320 g like the reconstituted cake of Example 1.

We claim:

1. A method for the preparation of a product wherein a material selected from the group consisting of yam, cassava, plantain and plantain mixed with cassava is cleaned, cooked, pureed and dried to flakes having a moisture content of from 6% to 15%, comprising:
   (a) compacting the flakes under a pressure of from 50 to 120 bars; and
   (b) reducing the compacted flakes to granules having a bulk density of from 0.40 to 0.65 kg/l.

2. A method for the preparation of a product wherein a material selected from the group consisting of yam, cassava, plantain and plantain mixed with cassava is cleaned, cooked, pureed and dried to flakes having a moisture content of at least 6%, comprising:
   (a) compacting the flakes under a pressure of from 50 to 120 bars; and
   (b) reducing the compacted flakes to granules having a bulk density of from 0.40 to 0.65 kg/l.

3. A method for the preparation of a product wherein a material selected from the group consisting of yam, cassava, plantain and plantain mixed with cassava is cleaned, cooked, pureed and dried to flakes having a moisture content of less than 6%, comprising:
   (a) adjusting the moisture content of the flakes to between 6% and 15%;
   (b) compacting the flakes under a pressure of from 50 to 120 bars; and
   (c) reducing the compacted flakes to granules having a bulk density of from 0.40 to 0.65 kg/l.

4. A method according to claim 1 or 2 wherein the granules are between about 0.5 and 2 mm in size.

5. A method according to claim 1 or 2 further comprising packaging the granules in a water-permeable bag.

6. The product of the method of claims 1 or 2 or 3.

7. The product of claim 6 packaged in a water-permeable bag.

8. A method according to claim 5 wherein the bag is filled to 45–80% of its volume with the granules such that the dry matter content of the product in the bag is from 30 to 36% upon rehydration.

9. A method according to claim 5 further comprising reconstituting the product by immersing the bag in water and heating by bringing the water to the boil.

10. A method according to claim 3 wherein the granules are between about 0.5 and 2 mm in size.

11. A method according to claim 3 further comprising packaging the granules in a water-permeable bag.

12. A method according to claim 11 wherein the bag is filled to 45–80% of its volume with the granules such that the dry matter content of the product in the bag is from 30 to 36% upon rehydration.

13. A method according to claim 11 or 12 further comprising reconstituting the product by immersing the bag in water and heating by bringing the water to the boil.

* * * * *